Patented June 14, 1938

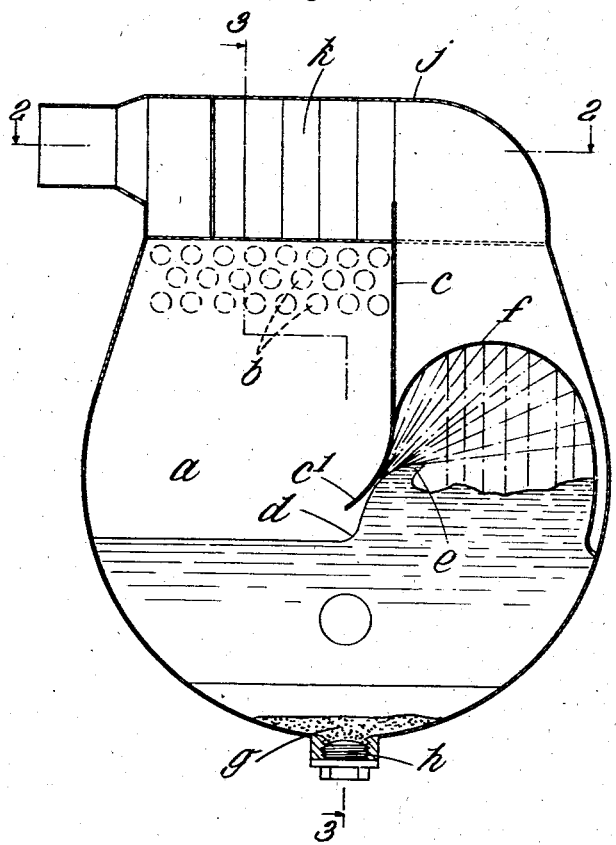
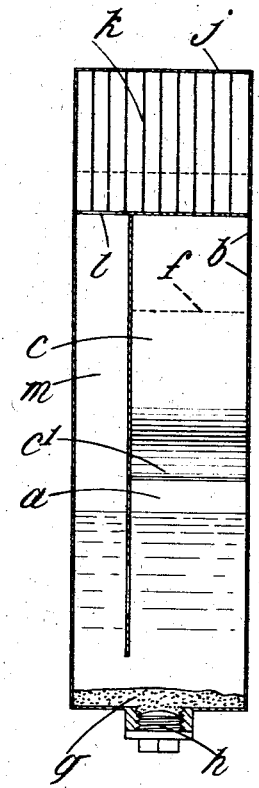
Fig. 1 Fig. 2 Fig. 3 Fig. 4

2,120,490

UNITED STATES PATENT OFFICE 2,120,490

APPARATUS FOR PURIFYING OR WASHING AIR OR OTHER GAS, OR FOR COOLING A LIQUID

Roy Macgregor Drummond, London, England

Application October 10, 1936, Serial No. 105,134
In Great Britain October 29, 1935

5 Claims. (Cl. 261—119)

The present invention relates to apparatus for purifying or washing air or other gas or for cooling a liquid.

The invention is capable of being applied in a wide variety of ways. It may, for example, be used in connection with air conditioning or smoke abatement plants or for purifying the air supplied to the carburetters of internal combustion engines. In this latter capacity the invention is particularly applicable to the cleansing of the air supplied to aeroplane engines when flying over sandy or dusty country. The invention is also applicable to the cooling of liquids supplied to the circulating system of an internal combustion engine.

The method consists in its simplest form in the creation of a wave in a liquid-containing vessel and in the conversion of the crest of such wave into a spray through which the gas to be purified or the liquid to be cooled is caused to pass.

Means for creating the desired wave consist of one or more baffle plates, which are preferably curved, and which extend downwardly from the upper part of the liquid-containing vessel, the lower edge or edges of the baffle or baffles being at a small distance above the liquid level. The entering air or other gas impinges against a baffle and is directed downwardly into contact with the liquid so that a trough is formed on one side of the baffle and a wave on the other. As the baffle does not extend downwardly to the liquid level the gas travels forward beneath the baffle and encounters the crest of the wave, sweeping from this crest a substantial volume of spray which extracts impurities from the gas and also cools it.

In the case of a liquid to be cooled air acts as a cooling agent, the air being admitted at one end and evacuated at the other end above the liquid. The lower end of the baffle is in this case preferably in the form of a flap to facilitate regulation of the flow.

One form of construction of the invention as applied to an air purifier for use in connection with an internal combustion engine is illustrated in the annexed drawing, in which:—

Fig. 1 is an elevation.

Fig. 2 is a section on the line 2—2 of Fig. 1, and

Fig. 3 is a section on the line 3—3 of Fig. 1.

Fig. 4 is a view of a modification.

In the drawing, $a$ is an inlet chamber into which air from the atmosphere enters through holes $b$ and strikes against the downwardly extending baffle $c$ having a curved lower end $c'$. The lower part of this chamber contains oil, but the lower part $c'$ of the baffle does not come into contact with this oil. The suction of the engine draws the air beneath this baffle, and a trough $d$ is formed in the oil on one side of the baffle and a crest $e$ on the other side of the baffle. The air drives a fine spray from the crest $e$ which mingles with and absorbs the dust and grit in the air. This spray impinges against a curved scrubber gauze $f$ which removes the last traces of grit from the air. The grit and other impurities form a residue $g$ at the bottom of the chamber $a$ from which they can be removed by withdrawal of a plug $h$. Any atomized oil remaining in the air is removed by contact with an eliminator $j$ which is in the form of a casing containing a plurality of superposed metal plates $k$ arranged in zig-zag fashion as shown in Fig. 2. This oil falls down through an aperture $l$ into a compensating chamber $m$. This compensating chamber being open to vacuum through the aperture $l$ causes the level of the oil in this chamber $m$ to rise or fall with consequent adjustment of oil level in the spray chamber to give the required depth of air stream under the baffle.

Mechanical means in the form of a rocker arm which raises or lowers the baffle may be provided as shown in Fig. 4 in which the lower end of the baffle is in the form of a flap.

Having thus described the nature of the said invention and the best means I know of carrying the same into practical effect, I claim:—

1. In apparatus of the class described, a vessel providing a main chamber, a baffle extending between the side walls thereof and dividing the chamber into an air inlet section and an air outlet section, and a body of liquid in said chamber, said baffle being curved at its lower portion toward the inlet section, the curve of the baffle being such that the lower edge of the baffle is spaced above the liquid and that the air upon passing beneath said edge strikes the curved portion substantially tangentially to the curve, thereby producing an upward current of air in said outlet section and an aspirating effect causing the air to exert a force on the liquid at said curved baffle and creating a wave of the contained liquid from the crest of which a spray will be thrown off.

2. Apparatus according to claim 1, in which a scrubber gauze is provided which is of curved form, and against which the spray impinges with removal of impurities.

3. In apparatus of the class described, a vessel providing a main chamber, a baffle extending between the side walls thereof and dividing the chamber into an air inlet section and an air outlet section, and a body of liquid in said chamber, said baffle being curved at its lower portion toward the inlet section, the curve of the baffle being such that the lower edge of the baffle is spaced above the liquid and that the air upon passing beneath said edge strikes the curved portion substantially tangentially to the curve, thereby producing an upward current of air in said outlet section and an aspirating effect causing the air to exert a force on the liquid at said curved baffle and creating a wave of the contained liquid from the crest of which a spray will be thrown off, and means for regulating the passage for air between the baffle and the liquid.

4. The structure according to claim 3 in which said regulating means comprises a compensating chamber provided adjacent said main chamber and so arranged as to compensate for changes in air velocity.

5. The structure according to claim 3 in which said regulating means comprises the lower curved edge of the baffle formed as an adjustable flap.

ROY MACGREGOR DRUMMOND.